Nov. 3, 1936.   W. L. ADAMS   2,059,765

FISHING REEL

Filed March 24, 1936

INVENTOR
WALTER L. ADAMS

BY Albert L. Ely

ATTORNEY

Patented Nov. 3, 1936

2,059,765

UNITED STATES PATENT OFFICE 2,059,765

FISHING REEL

Walter L. Adams, Akron, Ohio, assignor to The Enterprise Manufacturing Company, Akron, Ohio, a corporation of Ohio Application March 24, 1936, Serial No. 70,634

3 Claims. (Cl. 242—84.6)

The present invention relates to the art of fishing reels and particularly to a new design of reel of the nature generally designated as trout reels, although it may be applied to any type of fishing reel.

The object of the invention is to combine with an adjustable drag device a click mechanism which will be simple and inexpensive to manufacture and which is especially adapted for use on a reel of this character. The invention shown and described is primarily intended as an improvement upon the type of fishing reel shown in the copending application of Rudolph G. Wenzel, Serial No. 14,601, filed April 4, 1935, it being the purpose of the inventor to improve upon the device as shown in the said application and to combine therewith in a simple and economical fashion certain additional features, as will be more fully set forth.

In the drawing, the best known or preferred form of the invention is shown, but it will be understood that the invention may be embodied in other forms or modified and improved, all within the scope of the invention.

Figure 1:
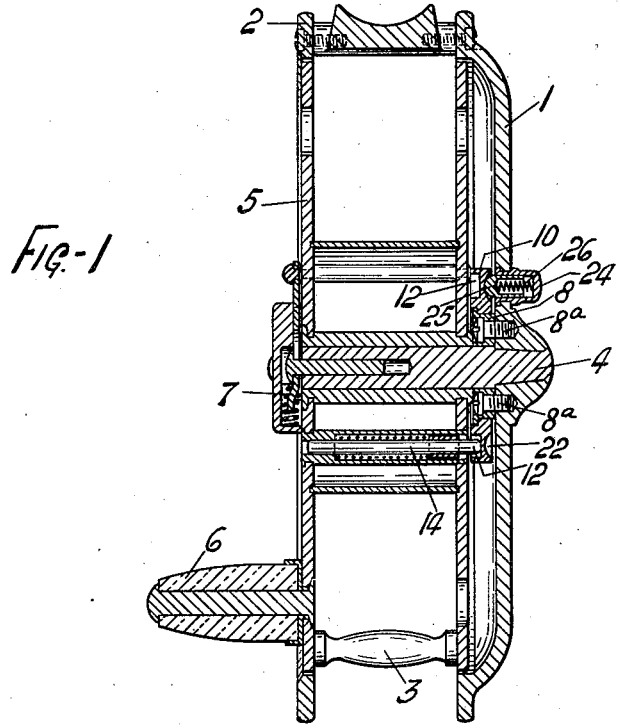
Figure 1 is a cross-section through a reel structure showing the improvements embodied therein.
Figure 3:
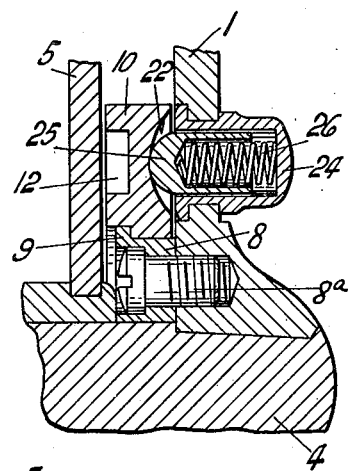
Figure 3 is an enlarged detail of the click mechanism.
Figure 2:
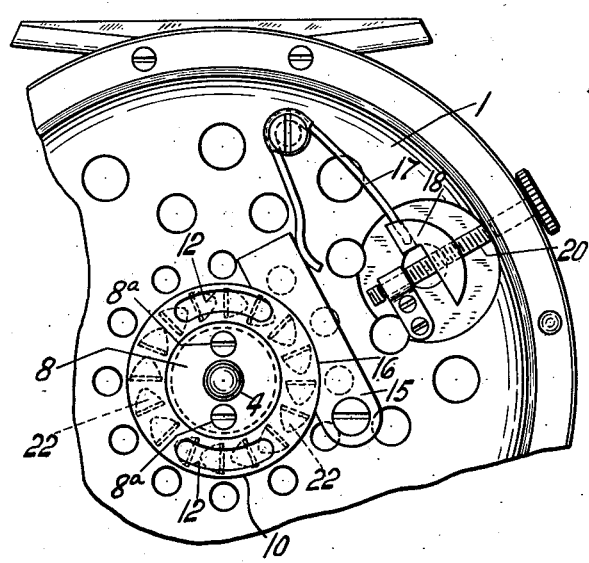
Figure 2 is an enlarged view of a fragment of the reel showing the drag mechanism.
Figures 4, 5:
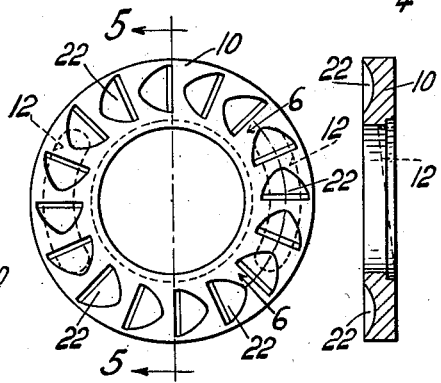
Figures 4, 5 and 6 are a side view and sections, respectively, on the drag ring, the Figures 5 and 6 being taken on the corresponding lines of Figure 4.
Figure 6:
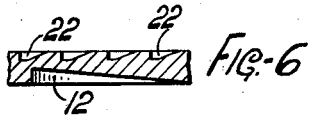

The reel comprises the usual frame consisting of the back plate 1 and an outside ring 2 connected therewith by pillars 3. Rising from the center of the back plate is a post or shaft 4 upon which the spool 5 is rotatably mounted. The outer surface of the spool is provided with a handle 6 and the usual catch 7 by which the spool may be latched upon the post. This is a well known construction of trout reel.

Around the base of the post 4 is secured a bearing ring 8 held in position by screws 8ª passing into the back plate. The outer periphery of the ring is formed with an overhanging flange 9. Surrounding the ring and held in position by the flange is the friction bearing ring 10.

The outer side face of the ring 10 is formed with ratchet depressions 12, here shown as two in number, and the spool is provided with a spring actuated pawl or pin 14 which will engage said depressions as the spool is rotated. When the spool is rotated to reel in the line, the pin 14 will ride over the depressions, but when the line is drawn out, the ratchet and pin engage and cause the joint rotation of the spool and the friction ring 10. The purpose of this construction is to exert a drag upon the fish when it runs with the line. To exert the requisite drag, a pivoted brake 15, having an arc-shaped bearing surface 16, is mounted upon the back plate and bears against the friction ring. Spring pressure is applied by the bent spring 17, one end of which bears upon the brake shoe and the other is held by the adjustable block 18 which is moved by the screw shaft 20.

Reels of this type have not heretofore been provided with a click mechanism and it is the purpose of the inventor to construct and combine therewith a simple form of click device, utilizing the elements of the drag mechanism for that purpose. The click mechanism serves as an alarm when the line is drawn outwardly.

In the improved construction, the drag or friction ring is formed on its inner side face with a plurality of shallow notches 22 arranged about the ring and the back plate of the reel carries a tubular housing 24 in which is seated a plunger or pawl 25 adapted to engage the notches 22 when the drag ring is rotated. A light spring 26 presses the pawl against the under surface of the drag ring.

It will thus be seen that the ring 10 not only serves as a drag or friction ring, but also constitutes the rotating element of the click mechanism. As the ring rotates only when the spool is rotated in the direction of line withdrawal, the click mechanism operates only at that time. The friction ring confines the click in place and the entire combination is simple and effective in construction.

While the construction shown is that which is preferred as the best known form of the invention, it is obvious that a reversal of parts or other modifications will not depart from the essentials of the invention.

What is claimed is:

1. A fishing reel comprising a frame and a rotatable spool journaled thereon, a rotatably mounted friction ring adjacent the spool, a ratchet notch in one face of the ring, a yielding pin on the spool engageable with the notch, depressions in the opposite face of the ring, and a click pawl on the frame in operative engagement with the depressions.

2. A fishing reel comprising a frame, a rotatable spool in the frame, a rotatably mounted friction ring lying between the spool and the frame, the outer side face of the ring being formed with a ratchet formation, a yieldingly mounted pin on the spool engageable with the ratchet, the inner side face of the ring being provided with depressions, and a spring click pawl mounted on the frame and engaging the depressions.

3. A fishing reel comprising a frame, a post rising therefrom, a spool rotatably mounted upon the post, a rotatable friction ring surrounding the post and lying between the spool and the frame, one face of the ring being provided with a ratchet notch, a spring pressed pin on the spool engaging the notch, the opposite face of the ring being provided with depressions, and a spring pressed pin on the frame engaging the depressions and constituting a click mechanism.

WALTER L. ADAMS.